(12) United States Patent
Jung et al.

(10) Patent No.: US 10,749,192 B2
(45) Date of Patent: Aug. 18, 2020

(54) HYDROGEN CONSUMPTION MEASURING METHOD FOR FUEL CELL SYSTEM

(71) Applicant: Hyundai Motor Company, Seoul (KR)

(72) Inventors: Se Kwon Jung, Seoul (KR); Ho June Bae, Seoul (KR); Ji Hyun Shim, Seoul (KR); Hyung Ki Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 176 days.

(21) Appl. No.: 15/277,612

(22) Filed: Sep. 27, 2016

(65) Prior Publication Data

US 2017/0301931 A1 Oct. 19, 2017

(30) Foreign Application Priority Data

Apr. 19, 2016 (KR) .................. 10-2016-0047390

(51) Int. Cl.
*H01M 8/00* (2016.01)
*H01M 8/04089* (2016.01)
*H01M 8/0432* (2016.01)
*H01M 8/04302* (2016.01)
*H01M 8/04992* (2016.01)
*H01M 8/0438* (2016.01)
*B60L 58/30* (2019.01)
*H01M 8/04225* (2016.01)
*H01M 8/04228* (2016.01)

(52) U.S. Cl.
CPC ......... *H01M 8/04089* (2013.01); *B60L 58/30* (2019.02); *H01M 8/04225* (2016.02); *H01M 8/04228* (2016.02); *H01M 8/04302* (2016.02); *H01M 8/04328* (2013.01); *H01M 8/04388* (2013.01); *H01M 8/04992* (2013.01); *B60L 2240/40* (2013.01); *H01M 2250/20* (2013.01); *Y02T 90/32* (2013.01); *Y02T 90/34* (2013.01)

(58) Field of Classification Search
CPC ......... H01M 8/04225; H01M 8/04089; H01M 8/04228
See application file for complete search history.

(56) References Cited

U.S. PATENT DOCUMENTS

2003/0173072 A1* 9/2003 Vinegar .................... B09C 1/02
166/66.5
2011/0200900 A1* 8/2011 Harris ............... H01M 8/04223
429/429
2012/0225364 A1* 9/2012 Matsumoto ....... H01M 8/04231
429/429

FOREIGN PATENT DOCUMENTS

| JP | 11-185792 A | 7/1999 |
|---|---|---|
| JP | 2005-027473 A | 1/2005 |
| JP | 2005-027476 A | 1/2005 |
| JP | 2005-327596 A | 11/2005 |
| JP | 2008-047329 A | 2/2008 |

(Continued)

*Primary Examiner* — Cynthia H Kelly
*Assistant Examiner* — Monique M Wills
(74) *Attorney, Agent, or Firm* — Morgan, Lewis & Bockius LLP

(57) ABSTRACT

A hydrogen consumption measuring method for a fuel cell system includes steps of: calculating an amount of hydrogen consumed for a representative section from a first pressure at a time when hydrogen is supplied into an anode and a second pressure at a time when the hydrogen is no longer supplied to the anode; and calculating a total amount of hydrogen consumed by accumulating amounts of hydrogen consumed from a plurality of sections.

12 Claims, 3 Drawing Sheets

(56) References Cited

FOREIGN PATENT DOCUMENTS

| JP | 2009-103245 A | 5/2009 |
|----|---------------|--------|
| KR | 10-2013-0065391 A | 6/2013 |
| KR | 10-1338456 B1 | 12/2013 |

* cited by examiner

HYDROGEN CONSUMPTION MEASURING METHOD FOR FUEL CELL SYSTEM

CROSS-REFERENCE TO RELATED APPLICATION

This application claims the benefit of priority to Korean Patent Application No. 10-2016-0047390, filed on Apr. 19, 2016 with the Korean Intellectual Property Office, the entirety of which is incorporated herein by reference.

TECHNICAL FIELD

The present disclosure relates to a hydrogen consumption measuring method for a fuel cell system. More particularly, it relates to a hydrogen consumption measuring method for a fuel cell system that can increase the accuracy of calculation of instant fuel efficiency and average fuel efficiency while driving a vehicle.

BACKGROUND

A hydrogen fuel cell vehicle is a vehicle that generates propulsion power using a motor driven by energy generated by reacting hydrogen and oxygen, and one can measure an amount of hydrogen present in a tank by measuring a pressure and a temperature of the hydrogen in a fuel (hydrogen) tank, and one can calculate the amount of fuel consumed in the vehicle by measuring the change in the amount of hydrogen present in the tank.

However, in the case of a hydrogen fuel cell vehicle, since high-pressure hydrogen of 700 bar or more is used as fuel and a temperature use range may be as wide as −40 to 85° C., the precision of the calculation measuring the amount of fuel present can decrease.

That is, since a pressure sensor and a temperature sensor are installed in the hydrogen tank of the hydrogen fuel cell vehicle and a volume of the hydrogen tank is predetermined in a design step, a hydrogen mass in the hydrogen tank can be calculated through an ideal gas equation (M=PV/RT) using values of the temperature and the pressure in the hydrogen tank, which are acquired from the pressure sensor and the temperature sensor.

A residual hydrogen amount and a hydrogen consumption amount can be determined from the change in the hydrogen mass in the hydrogen tank, and can be measured in real time, so real-time fuel efficiency may be calculated. Average fuel efficiency of the vehicle may also be calculated using the driving distance data of the vehicle, and a remaining driving distance of the vehicle may be derived from the calculated real-time fuel efficiency and average fuel efficiency, and this may all be displayed in a cluster to provide information to the driver.

However, because the pressure in the hydrogen tank is very high, the resolution of the pressure sensor is low, the temperature variation range is large, and the resolution of the temperature sensor is low, there is significant error in calculating the hydrogen mass in the hydrogen tank. Therefore, there are more occurrences of error in the displayed fuel efficiency and in the displayed remaining driving distance of the vehicle, which leads to customer dissatisfaction.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art and to provide a hydrogen consumption measuring method for a fuel cell system, which can increase the accuracy of calculation for fuel efficiency and display of a remaining driving distance of a vehicle by supplying hydrogen supplied to a fuel cell stack with a specific pressure pattern and accurately measuring a total hydrogen consumption consumed in the fuel cell system during a driving time by calculating the number of generation times of a triangular wave formed through the supplied hydrogen and one hydrogen consumption depending thereon.

In one aspect, the present disclosure provides a hydrogen consumption measuring method for a fuel cell system including steps of: calculating an amount of hydrogen consumed for a representative section from a first pressure at a time when hydrogen is supplied into an anode and a second pressure at a time when the hydrogen is no longer supplied to the anode; and calculating a total amount of hydrogen consumed by accumulating amounts of hydrogen consumed from a plurality of sections.

In another exemplary embodiment, the amount of hydrogen consumed for the representative section may be calculated according to the equation:

$$\text{the amount of hydrogen consumed} = (P_{Bn}/T_{Bn} - P_{An}/T_{An}) * V * C,$$

where $P_{An}$ is an internal pressure of the anode at the time when the hydrogen is supplied to the anode;

$P_{Bn}$ is an internal pressure of the anode at the time when the hydrogen is no longer supplied to the anode;

$T_{An}$ is an internal temperature of the anode at the time when the hydrogen is supplied to the anode;

$T_{Bn}$ is an internal temperature of the anode at the time when the hydrogen is no longer supplied to the anode;

V is an internal volume of the anode; and

C is a conversion coefficient.

The first pressure may be an initial pressure and the second pressure may be a reference pressure.

The amount of hydrogen consumed for the representative section may be calculated according to the equation:

$$\text{the amount of hydrogen consumed} = (P_B/T_B - P_A/T_A) * V * C,$$

where $P_A$ is an internal pressure of the anode at the initial pressure;

$P_B$ is an internal pressure of the anode at the reference pressure;

$T_A$ is an internal temperature of the anode at the initial pressure;

$T_B$ is an internal temperature of the anode at the reference pressure; and

V is an internal volume of the anode.

In the step of calculating the amount of hydrogen consumed for the representative section, the amount of hydrogen consumed for the representative section may be calculated according to the equation:

$$\text{the amount of hydrogen consumed} = (P_B - P_A) * V * 1/T * C,$$

where $P_A$ is an internal pressure of the anode at the initial pressure;

$P_B$ is an internal pressure of the anode at the reference pressure;

T is an internal temperature of the fuel cell stack;

V is an internal volume of anode; and

C is a conversion coefficient.

In the step of calculating the amount of hydrogen consumed for the representative section, the amount of hydrogen consumed for the representative section may be calculated according to the equation:

$$\text{the amount of hydrogen consumed} = C_P * V * 1/T * C,$$

where $C_P$ is a difference between a maximum pressure and the reference pressure;

V is an internal volume of the anode;

T is an internal temperature of the fuel cell stack; and

C is a conversion coefficient.

The method may further include a step of verifying a residual hydrogen amount in a hydrogen tank before the vehicle starts.

The method may further include a step of determining a current residual hydrogen amount by calculating a difference between the residual hydrogen amount and the total amount of hydrogen consumed.

The method may further include a step of displaying the current residual hydrogen amount on a display of the vehicle.

In the step of calculating the total amount of hydrogen consumed, the total amount of hydrogen consumed may be calculated from the time when the vehicle starts to the time when the start of the vehicle ends.

In the step of calculating the total amount of hydrogen consumed, the total amount of hydrogen consumed is calculated by multiplying a reference hydrogen consumption calculated according to the initial pressure and the reference pressure by a number of times that the hydrogen supply and the hydrogen supply end.

In still another exemplary embodiment, a hydrogen consumption measuring method for a fuel cell system includes steps of: setting an initial pressure and a reference pressure for an inside of an anode and calculating a reference hydrogen consumption calculated according to the initial pressure and the reference pressure; starting a vehicle in a state of the initial pressure; ending the start of the vehicle in the state of the initial pressure; and detecting a number of cycles where hydrogen has been supplied to the anode and then the hydrogen has been no longer supplied to the anode until the start ends after the vehicle starts and multiplying the number of cycles by the reference hydrogen consumption to calculate a total hydrogen consumption. In still another exemplary embodiment, the reference hydrogen consumption may be calculated according to the equation:

$$\text{the reference hydrogen consumption} = (P_B - P_A) * V * 1/T * C,$$

where $P_A$ is an internal pressure of the anode at the initial pressure;

$P_B$ is an internal pressure of the anode at the reference pressure;

T is an internal temperature of the fuel cell stack;

V is an internal volume of anode; and

C is a conversion coefficient.

The method may further include a step of determining a current residual hydrogen amount by calculating a difference between a prestored residual hydrogen amount before the vehicle starts and the total hydrogen consumption.

In another exemplary embodiment, the method further includes displaying the current residual hydrogen amount on a display of the vehicle.

According to exemplary embodiments in the present disclosure, accuracy of calculation of fuel efficiency and display of a residual driving distance of a vehicle can increase by supplying hydrogen supplied to a fuel cell stack with a specific pressure pattern and accurately measuring a total hydrogen consumption consumed in the fuel cell system during a driving time by calculating the number of generation times of a triangular wave formed through the supplied hydrogen and one hydrogen consumption depending thereon.

Whether a temperature sensor and a pressure sensor mounted in a hydrogen tank normally operate can be verified by comparing the measured hydrogen consumption and a reference hydrogen consumption calculated by using a temperature and a pressure of a hydrogen tank.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
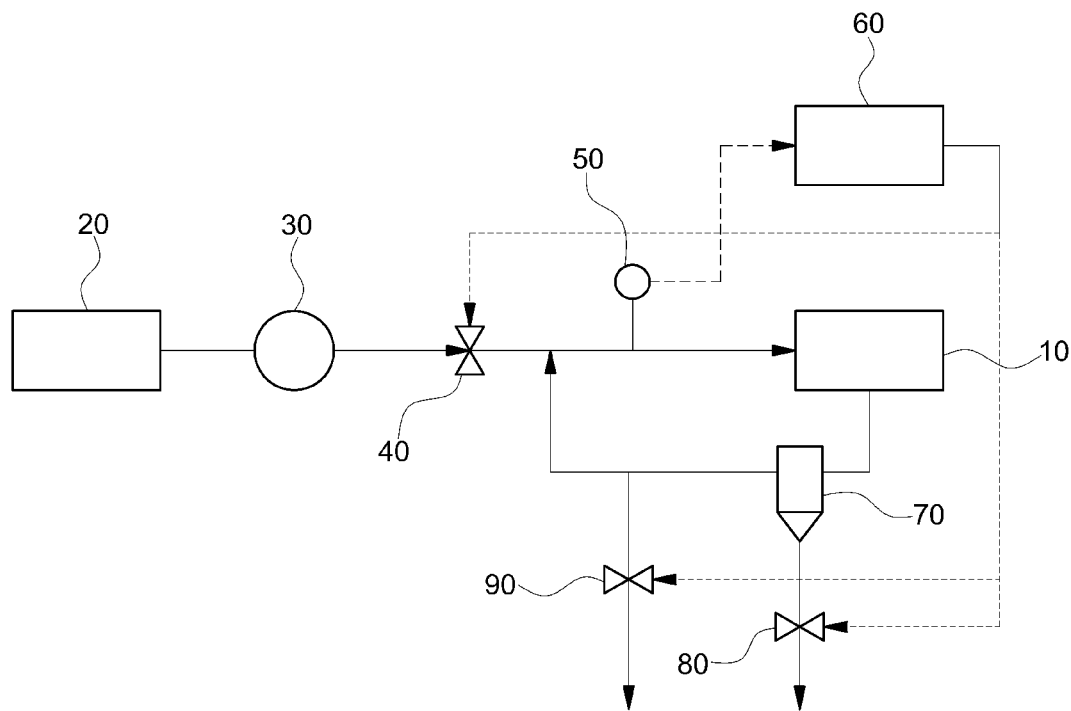
FIG. 1 is a diagram illustrating an anode structure of a general fuel cell system.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment in the present disclosure will be described in more detail with reference to the accompanying drawings.

The advantages and features of the present invention, and a method of accomplishing these will become obvious with reference to embodiments to be described below in detail along with the accompanying drawings.

However, the present disclosure is not limited to the exemplary embodiments set forth below, and may be embodied in various other forms. The present exemplary embodiments are for rendering the description of the present disclosure complete and are set forth to provide a complete understanding of the scope of the disclosure to a person with ordinary skill in the technical field to which the present disclosure pertains, and the present disclosure will only be defined by the scope of the claims.

In the following description, a detailed explanation of known associated technologies may be omitted to avoid unnecessarily obscuring the subject matter of the present disclosure.

FIG. 1 is a diagram illustrating an anode structure for a general fuel cell system.

As illustrated in FIG. 1, hydrogen may be supplied to a fuel cell stack 10 in a fuel cell system of a vehicle and gas may be discharged from an anode of the fuel cell stack 10 to be recirculated.

First, high-pressure (700 bar) gas stored in a hydrogen tank 20 is depressurized through a regulator 30 (10 to 20 bar) and secondarily depressurized (0 to 5 bar) through a hydrogen supply valve 40 and an ejector (not illustrated) to be supplied to the anode of the fuel cell stack 10.

Herein, the gas discharged from the anode of the fuel cell stack 10 is recirculated to the ejector (not illustrated), and as a result, the gas is mixed with hydrogen supplied from the hydrogen tank 20 to be supplied to the fuel cell stack 10.

In this case, an internal pressure of the fuel cell stack 10 and the anode including a recirculation path described above is measured through a pressure sensor 50 and a value of the internal pressure is transferred to a controller 60.

The amount of the hydrogen supplied to the fuel cell stack 10 may be controlled using the hydrogen supply valve 40, and the hydrogen supply valve 40 may be a proportional control valve, an ON/OFF valve, an injector, and the like, and may control a flow rate of the hydrogen passing through the hydrogen supply valve 40 through the controller 60.

Since structures such as a water trap 70 collecting water generated from the fuel cell stack 10, a drain valve 80 discharging the water collected by the water trap 70, and a purge valve 90 installed to remove foreign materials included in the recirculation path are known, detailed description of these structures and their operation will be omitted.

In the exemplary embodiment based on the structure of the fuel cell system, as the vehicle starts, the hydrogen consumption may be calculated by using a hydrogen pressure at the time of supplying the hydrogen into the anode and a hydrogen pressure at the time when the hydrogen is no longer supplied to the anode. Because the total hydrogen consumption of the fuel cell stack 10 may be accurately measured through the calculated hydrogen consumption, the accuracy of calculation of fuel efficiency and display of a remaining driving distance of the vehicle may increase.

Figure 2:
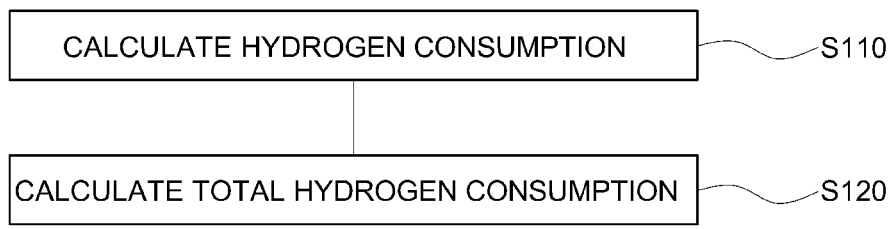
FIG. 2 is a conceptual view illustrating a hydrogen consumption measuring method of a fuel cell system according to an exemplary embodiment in the present disclosure.
Figure 3:
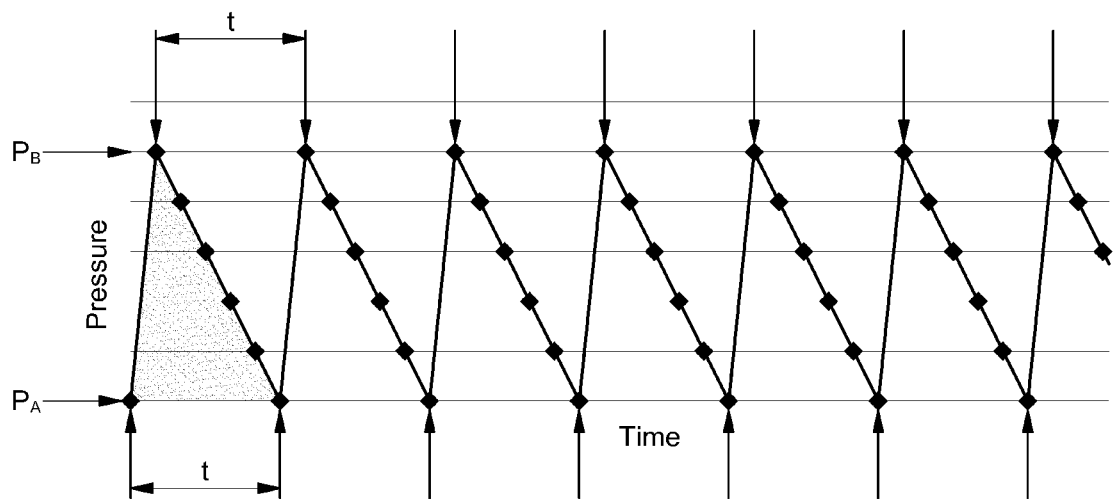
FIG. 3 is a graph showing calculation of total hydrogen consumption in the hydrogen consumption measuring method for a fuel cell system according to the exemplary embodiment in the present disclosure.

FIG. 2 is a conceptual view illustrating a hydrogen consumption measuring method for a fuel cell system according to an exemplary embodiment in the present disclosure and FIG. 3 is a graph showing calculation of a total hydrogen consumption in the hydrogen consumption measuring method for a fuel cell system according to the exemplary embodiment.

As illustrated in FIG. 2, the hydrogen consumption measuring method for a fuel cell system according to the exemplary embodiment is described below.

First, the hydrogen consumption of a corresponding section is calculated from a first pressure at the time when the hydrogen is supplied into the anode and a second pressure at the time when the hydrogen is no longer supplied (S110).

That is, when the hydrogen is supplied into the anode at the first pressure, the hydrogen in the anode is excessively supplied until the hydrogen pressure reaches a second pressure from the first pressure. When it is determined that the hydrogen pressure in the anode reaches the second pressure through the pressure sensor, the hydrogen is no longer supplied.

When the hydrogen is no longer supplied because the hydrogen pressure reaches the second pressure, one section is consequently formed, in which the hydrogen pressure varies from the first pressure to the second pressure and varies from the second pressure to the first pressure again. This is because the hydrogen which increased the pressure to the second pressure decreases due to the consumption of hydrogen in the fuel cell system, such as from generation, purge, crossover, and the like, and as a result, the hydrogen pressure in the anode decreases to fall to the first pressure.

The hydrogen consumption during the section may be calculated by <Equation 1> given below.

$$\text{Hydrogen consumption} = (P_{Bn}/T_{Bn} - P_{An}/T_{An}) * V * C \qquad \text{<Equation 1>}$$

Herein, $P_{An}$ represents the internal pressure of the anode at an An point (the hydrogen supply time), $P_{Bn}$ represents the internal pressure of the anode at a Bn point (the hydrogen supply end time), $T_{An}$ represents an internal temperature of the anode at the An point (the hydrogen supply time), $T_{Bn}$ represents the internal pressure of the anode at the Bn point (the hydrogen supply end time), V represents an internal volume of the anode, and C represents a conversion coefficient.

Since the internal volume V of the anode is constant and the conversion coefficient C is a constant including a gas constant and a molecular weight/volume/mass conversion coefficient, and the like, the hydrogen consumption for the corresponding section may be consequently calculated from the first pressure at the time when the hydrogen is supplied into the anode and the second pressure at the time when the hydrogen supply ends through <Equation 1> given above.

Herein, it is characterized in that the conversion coefficient C is marked by integrating a gas constant and a mol number, a coefficient for converting a mass, and a constant considering a difference between ideal gas and hydrogen as PV=mRT in a general ideal gas state equation and in this case, R is a gas constant (8.3143 $m^3 \cdot Pa \cdot K^{-1} \cdot mol^{-1}$).

The calculated consumption of hydrogen in this section may be determined from integrating all of the calculated hydrogen consumption of the section from the time when the vehicle starts up to the time when the start of the vehicle ends to calculate total hydrogen consumption (S120), and as a result, a difference between the calculated total hydrogen consumption and the residual hydrogen amount verified before the hydrogen consumption calculating step is performed (S110), that is, before the vehicle starts is calculated to calculate a current residual hydrogen amount as well.

The current residual hydrogen amount may be displayed on a cluster of the vehicle, and as a result, the accuracy of the calculation of the fuel efficiency and the display of the remaining driving distance of the vehicle may increase by using the total hydrogen consumption and the current residual hydrogen amount and the satisfaction of a consumer may be improved.

By assuming that the first pressure is an initial pressure $P_A$ and the second pressure is a reference pressure $T_B$ in the hydrogen consumption calculating step (S110) as illustrated in FIG. 3, when the initial pressure and the reference pressure are constant from the time when the vehicle starts up to the time when the start of the vehicle ends, the hydrogen consumption for the corresponding section is calculated by <Equation 2> given below.

$$\text{Hydrogen consumption} = (P_B/T_B - P_A/T_A) * V * C \qquad \text{<Equation 2>}$$

Herein, $P_A$ represents the internal pressure of the anode at an A point (the initial pressure), $P_B$ represents the internal pressure of the anode at a B point (the reference pressure), $T_A$ represents the internal temperature of the anode at the A point (the initial pressure), $T_B$ represents the internal pressure of the anode at the B point (the reference pressure), V represents the internal volume of the anode, and C represents the conversion coefficient.

A time t illustrated in FIG. 3 is a unit time from the time when the hydrogen pressure in the anode increases up to $P_B$ which is the reference pressure from $P_A$ which is the initial pressure to the time when the hydrogen pressure reaches the initial pressure $P_A$ again and a value of t is influenced by the hydrogen consumption of the fuel cell system.

For reference, when a hydrogen supply amount is sufficiently large and the time when the hydrogen pressure reaches the reference pressure $P_B$ from the initial pressure $P_A$ thus decreases, the t value is approximated and converged to the time when the hydrogen pressure in the anode reaches the initial pressure $P_A$ from the reference pressure $P_B$ and in this case, the t value becomes a time when the fuel cell system consumes the hydrogen, and consequently, the t value decreases when the hydrogen cell system consumes more hydrogen (when the system produces more electricity) and increases when the fuel cell system consumes less hydrogen.

If the hydrogen supply amount is not sufficiently large and the time when the hydrogen pressure reaches the reference pressure $P_B$ from the initial pressure $P_A$ is significantly long, when the hydrogen consumption calculated by using a stack current generation amount during the time is added, the accuracy of the calculation may be further improved.

Since the $P_A$ and $P_B$ may be measured through the pressure sensor of the fuel cell system, the $T_A$ and $T_B$ may also be measured through the temperature sensor, V is a value determined according to the fuel cell stack, and C is a predetermined constant value according to the gas constant and the molecular weight/volume/mass conversion coefficient, the hydrogen consumption for one section may be calculated by using <Equation 2> given above through the measured and determined values.

In this case, since the internal temperature of the anode tends not to rapidly vary within a short time when the fuel cell system operates, "$T_A \approx T_B \approx$ fuel cell stack temperature T" may be regarded and in this case, the hydrogen consumption for one section may be simplified by <Equation 3> given below, and as a result, a resource of the controller consumed for calculating the hydrogen consumption for the corresponding section may be reduced.

$$\text{Hydrogen consumption} = (P_B - P_A) * V * 1/T * C \qquad \text{<Equation 3>}$$

Herein, T represents the temperature of the fuel cell stack and since the $P_A$, $P_B$, V, and C values are the same as those in <Equation 2> given above, the $P_A$, $P_B$, V, and C values will be omitted.

When the hydrogen is supplied to the fuel cell system, assuming that a relationship of "$P_B = P_A + C_P$ ($C_P$ = constant)" is formed, the hydrogen consumption for one section may be further simplified as shown in <Equation 4> given below and a calculation speed of the hydrogen consumption for one section may be further improved while the consumption resource of the controller is minimized.

$$\text{Hydrogen consumption} = C_P * V * 1/T * C \qquad \text{<Equation 4>}$$

In the <Equation 4>, $C_P$ represents a difference between the reference pressure and the initial pressure in one section and since V, T, and C are the same as those of <Equation 3> described above, V, T, and C will be omitted.

Consequently, in the exemplary embodiment, the total hydrogen consumption during a total driving time of the vehicle may be accurately calculated by multiplying the number of repetition times of the hydrogen supply and the supply end by the reference hydrogen consumption calculated according to the initial pressure and the reference pressure through <Equation 4> described above (S120).

In the exemplary embodiment, the current residual hydrogen amount may be determined through the difference between the measured total hydrogen consumption and the residual hydrogen amount measured before the vehicle starts and in this case, it may be verified whether the temperature sensor and the pressure sensor normally operate by verifying the current residual hydrogen amount through the cluster of the vehicle and determining the difference between the current residual hydrogen amount and the previous residual hydrogen amount.

Figure 4:
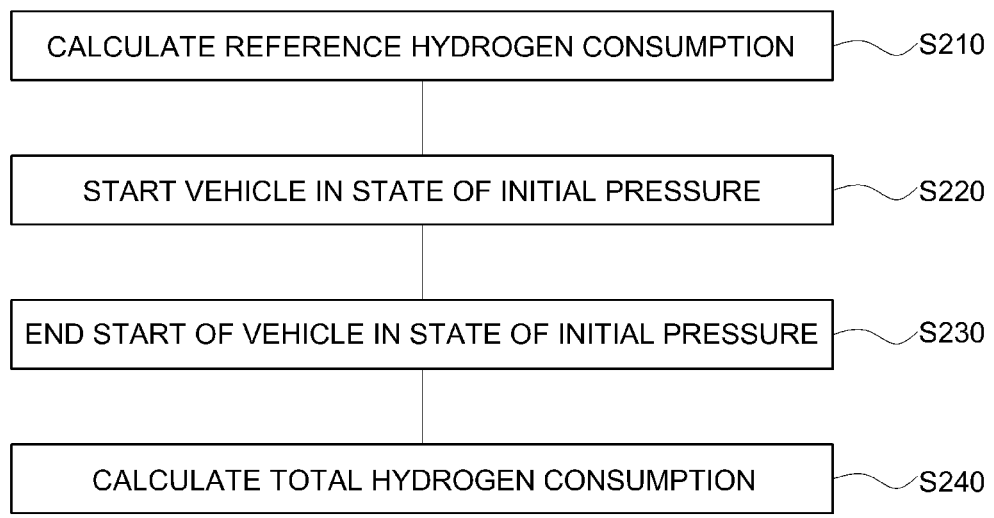
FIG. 4 is a conceptual view illustrating a hydrogen consumption measuring method of a fuel cell system according to another exemplary embodiment in the present disclosure.
Figure 5:
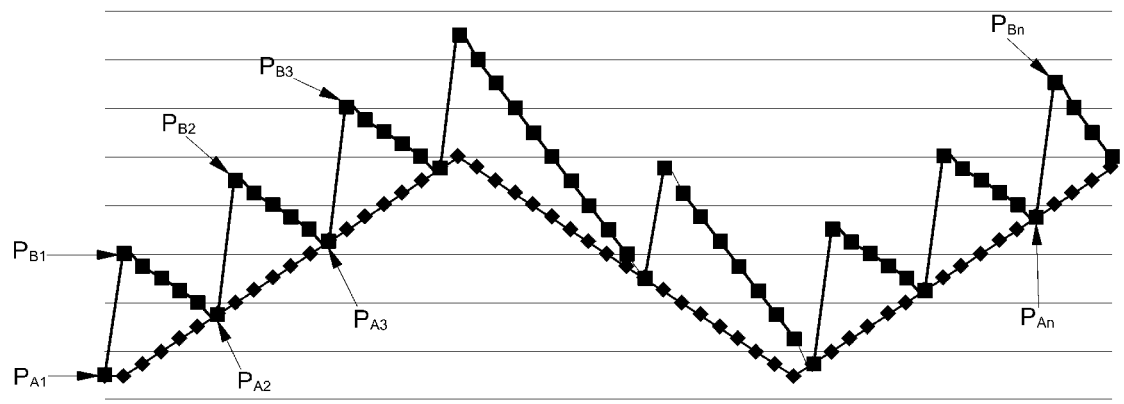
FIG. 5 is a graph showing calculation of total hydrogen consumption in the hydrogen consumption measuring method of a fuel cell system according to another exemplary embodiment in the present disclosure.

Hereinafter, FIG. 4 is a conceptual view illustrating a hydrogen consumption measuring method for a fuel cell system according to another exemplary embodiment in the present disclosure and FIG. 5 is a graph showing calculation of a total hydrogen consumption in the hydrogen consumption measuring method of a fuel cell system according to another exemplary embodiment in the present disclosure.

As illustrated in FIG. 4, the hydrogen consumption measuring method for a fuel cell system according to the exemplary embodiment is described below.

In general, in the fuel cell vehicle, in most cases, the section in which the initial pressure and the reference pressure are constantly maintained as described above through FIGS. 2 and 3 and a section in which the initial pressure varies are complexly applied as illustrated in FIG. 5.

That is, in the exemplary embodiment, when the initial pressure repeatedly increases and decreases under an operating condition such as an output condition of the fuel cell system, or the like after the vehicle starts, the initial pressure and the reference pressure for the inside of the anode are first set and the reference hydrogen consumption for one section, which is calculated according to the set initial pressure and reference pressure is calculated (S210).

Thereafter, the vehicle starts in a state of an initial pressure (S220).

The start of the vehicle ends in the state of the initial pressure (S230).

Finally, the number of repetition times of the hydrogen supply and the supply end is detected until the start ends after the vehicle starts and the number of repetition times is multiplied by the reference hydrogen consumption calculated in the reference hydrogen consumption calculating step (S210) to calculate the total hydrogen consumption (S240).

In the reference hydrogen consumption calculating step (S210), the reference hydrogen consumption may be calculated by <Equation 3> given below, assuming that the difference between the reference pressure $P_{Bn}$ and the initial pressure $P_{An}$ is constant until the start of the vehicle ends after the vehicle starts.

$$\text{Hydrogen consumption} = (P_B - P_A) * V * 1/T * C \qquad \text{<Equation 3>}$$

Herein, $P_A$ represents the internal pressure of the anode at the A point (the initial pressure), $P_B$ represents the internal pressure of the anode at the B point (the reference pressure), T represents the temperature of the fuel cell stack, V represents the internal volume of the anode, and C represents the conversion coefficient.

In this case, since the internal volume of the anode is constant and an output of the fuel cell system is 0 at the start time and the start end time of the vehicle, the reference pressures at the vehicle start time and the start end time may be generally the same as each other.

A difference between the internal temperature of the anode at the start time and the internal temperature of the anode at the start end time may occur, but the difference is very slight, and as a result, the difference may be disregarded.

That is, since the pressure values when the vehicle starts and the start ends are the same as each other, a difference in a hydrogen supply amount by a difference between $P_{An}$ and $P_{An+1}$ is compensated at $P_{An+1}$ and a time after $P_{An+1}$ as the initial pressure repeatedly increases and decreases under a condition in which "$\Delta P = P_{Bn} - P_{An}$" is constant as shown in the graph of FIG. 5, and as a result, the hydrogen supply amount within the total driving time may be calculated using the same equation as when the initial pressure is constant.

Consequently, in the exemplary embodiment, the reference hydrogen consumption may be accurately calculated regardless of the case in which the initial pressure of the fuel cell system varies, and as a result, the total hydrogen consumption calculated by multiplying the number of repetition times of the reference hydrogen consumption by the reference hydrogen consumption may also be accurately calculated (S240).

Meanwhile, in the exemplary embodiment, the current residual hydrogen consumption may be determined through the difference between the residual hydrogen amount before the start, which is prestored after the total hydrogen consumption calculating step (S240) and the calculated total hydrogen consumption and the current residual hydrogen amount is displayed on the cluster of the vehicle to increase the accuracy of the display of the remaining driving distance, and as a result, the satisfaction of the consumer may be improved.

According to the exemplary embodiments in the present disclosure, the accuracy of the calculation of the fuel efficiency and the display of the remaining driving distance of the vehicle can increase by supplying the hydrogen supplied to the fuel cell stack with a specific pressure pattern and accurately measuring the total hydrogen consumption consumed in the fuel cell system during the driving time by calculating the number of generation times of a triangular wave formed through the supplied hydrogen and one hydrogen consumption depending thereon.

Whether the temperature sensor and the pressure sensor mounted in the hydrogen tank normally operate can be verified by comparing the measured hydrogen consumption and the reference hydrogen consumption calculated by using the temperature and the pressure of the hydrogen tank.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A hydrogen consumption measuring method for a fuel cell system, comprising steps of:
   controlling, by a controller, hydrogen supply to an anode of a fuel cell;
   increasing, by the controller, hydrogen pressure from a first pressure at which hydrogen is initially supplied to the anode to a second pressure at which the hydrogen is no longer supplied to the anode, wherein:
   the controller controls the hydrogen pressure by a predetermined pressure pattern which includes a plurality of cycles, and
   in each of the plurality of cycles, the hydrogen pressure is increased from the first pressure to the second pressure and thereafter decreased to the first pressure;
   determining, by the controller, an amount of hydrogen consumed in the fuel cell for each of the plurality of cycles and a total number of the plurality of cycles in the predetermined pressure pattern;
   determining, by the controller, a total amount of hydrogen consumed in the fuel cell by accumulating the amount of hydrogen consumed for each of the plurality of cycles;
   verifying a residual hydrogen amount in a hydrogen tank before a vehicle starts;
   determining a current residual hydrogen amount by a difference between the residual hydrogen amount and the total amount of hydrogen consumed; and
   displaying the current residual hydrogen amount on a display of the vehicle.

2. The method of claim 1, wherein the amount of hydrogen consumed for each of the plurality of cycles is calculated based on an internal pressure $P_{An}$ of the anode at the time when the hydrogen is supplied to the anode; an internal pressure $P_{Bn}$ of the anode at the time when the hydrogen is no longer supplied to the anode; an internal temperature $T_{An}$ of the anode at the time when the hydrogen is supplied to the anode; an internal temperature $T_{Bn}$ of the anode at the time when the hydrogen is no longer supplied to the anode; an internal volume V of the anode, and a conversion coefficient C.

3. The method of claim 1, wherein the first pressure is an initial pressure and the second pressure is a reference pressure.

4. The method of claim 3, wherein the amount of hydrogen consumed for each of the plurality of cycles is calculated based on an internal pressure $P_A$ of the anode at the initial pressure; an internal pressure $P_B$ of the anode at the reference pressure; an internal temperature $T_A$ of the anode at the initial pressure; an internal temperature $T_B$ of the anode at the reference pressure; and an internal volume V of the anode.

5. The method of claim 3, wherein in the step of determining an amount of hydrogen consumed for each of the plurality of cycles, the amount of hydrogen consumed for each of the plurality of cycles is calculated based on an internal pressure $P_A$ of the anode at the initial pressure; an internal pressure $P_B$ of the anode at the reference pressure; an internal temperature T of the fuel cell; an internal volume V of anode; and a conversion coefficient C.

6. The method of claim 5, wherein in the step of determining an amount of hydrogen consumed for the each of the plurality of cycle, the amount of hydrogen consumed for each of the plurality of cycles is calculated based on a difference $C_P$ between a maximum pressure and the reference pressure; an internal volume V of the anode; an internal temperature T of the fuel cell; and a conversion coefficient C.

7. The method of claim 1, wherein in the step of determining a total amount of hydrogen consumed, the total amount of hydrogen consumed is calculated from the time when the vehicle starts to the time when the start of the vehicle ends.

8. The method of claim 3, wherein in the step of determining a total amount of hydrogen consumed, the total amount of hydrogen consumed is calculated by multiplying a reference hydrogen consumption calculated according to the initial pressure and the reference pressure by the total number of the plurality of cycles in the predetermined pressure pattern.

9. A hydrogen consumption measuring method for a fuel cell system, comprising steps of:
controlling, by a controller, hydrogen supply to an anode of a fuel cell;
increasing, by the controller, hydrogen pressure from an initial pressure at which hydrogen is initially supplied to the anode to a reference pressure at which the hydrogen is no longer supplied to the anode, wherein:
the controller controls the hydrogen pressure by a predetermined pressure pattern which includes a plurality of cycles, and
in each of the plurality of cycles, the hydrogen pressure increases from the initial pressure to the reference pressure and thereafter decreases to the initial pressure;
setting, by the controller, the initial pressure and the reference pressure for an inside of the anode and determining, by the controller, a reference hydrogen consumption in the fuel cell according to the initial pressure and the reference pressure;
starting a vehicle in a state of the initial pressure;
ending the start of the vehicle in the state of the initial pressure;
detecting, by the controller, a total number of the plurality of cycles in the predetermined pressure pattern until the start ends after the vehicle starts, and determining, by the controller, a total hydrogen consumption in the fuel cell by multiplying the total number of the plurality of cycles by the reference hydrogen consumption;
determining a current residual hydrogen amount by determining a difference between a prestored residual hydrogen amount before the vehicle starts and the total hydrogen consumption;
displaying the current residual hydrogen amount on a display of the vehicle.

10. The method of claim 9, wherein the reference hydrogen consumption is calculated based on an internal pressure $P_A$ of the anode at the initial pressure; an internal pressure $P_B$ of the anode at the reference pressure; an internal temperature T of the fuel cell; an internal volume V of anode; and a conversion coefficient C.

11. The method of claim 1, wherein in each of the plurality of cycles, the hydrogen pressure linearly increases from the first pressure to the second pressure and thereafter linearly decreases to the first pressure.

12. The method of claim 9, wherein in each of the plurality of cycles, the hydrogen pressure linearly increases from the initial pressure to the reference pressure and thereafter linearly decreases to the initial pressure.

* * * * *